US007013950B2

(12) United States Patent
Steneby et al.

(10) Patent No.: US 7,013,950 B2
(45) Date of Patent: Mar. 21, 2006

(54) VENTILATION DEVICE

(76) Inventors: Bengt Steneby, Fornfyndsvägen 14 A, Partille (SE) SE-433 41; Torsten Mattsson, Charles väg 16, Hovås (SE) SE-436 55

( * ) Notice: Subject to any disclaimer, the term of this patent is extended or adjusted under 35 U.S.C. 154(b) by 0 days.

(21) Appl. No.: 10/275,305

(22) PCT Filed: May 2, 2001

(86) PCT No.: PCT/SE01/00937

§ 371 (c)(1),
(2), (4) Date: Apr. 21, 2003

(87) PCT Pub. No.: WO01/84057

PCT Pub. Date: Nov. 8, 2001

(65) Prior Publication Data

US 2003/0159802 A1    Aug. 28, 2003

(30) Foreign Application Priority Data

May 2, 2000    (SE)    ................................. 0001612

(51) Int. Cl.
  *F24F 7/007*    (2006.01)
  *F24F 7/08*    (2006.01)
(52) U.S. Cl. ...................... 165/11.1; 165/54; 165/166; 165/248

(58) Field of Classification Search .................. 165/54, 165/248, 166, 244, 11.1
See application file for complete search history.

(56) References Cited

U.S. PATENT DOCUMENTS 3,977,466 A * 8/1976 Johansson .................... 165/286

(Continued)

FOREIGN PATENT DOCUMENTS

DE    2 329 109 A    12/1973

(Continued)

*Primary Examiner*—John K. Ford
(74) *Attorney, Agent, or Firm*—Sughrue Mion, PLLC

(57) ABSTRACT

The invention relates to a ventilation device for ventilation room by room and/or zone by zone and comprises: a) a device casing (12), which is provided in or adjacent an outer wall of a building or the like and which connects room air to outside air, b) a heat-exchange (22) of counter flow type, provided in the casing (12) and transferring heat from the outgoing and in-going airflows, respectively, c) two fans (18,20) arranged in said casing (12), of which one is connected to the ingoing air duct (14) of the heat-exchanger (22) and the other to the outgoing air duct (16) of the heat-exchanger (22), d) at least one sensor (30) for determination of the airflow's relative deviation in velocity from a neutral value of the airflows passing through each respective duct (14, 16), and e) a control means (32), which, depending on the values given by the sensor (30), is arranged to regulate the rotation speed of the fans (18, 20), for the purpose of substantially balancing the airflow, so that it is substantially equal for the ingoing and outgoing air.

21 Claims, 5 Drawing Sheets

U.S. PATENT DOCUMENTS

| | | | |
|---|---|---|---|
| 4,131,159 A | | 12/1978 | Long |
| 4,228,849 A | * | 10/1980 | Heinola ...................... 165/286 |
| 4,375,224 A | * | 3/1983 | Noll |
| 4,461,344 A | * | 7/1984 | Allen et al. |
| 4,512,392 A | * | 4/1985 | van Ee et al. |
| 5,024,263 A | | 6/1991 | Laine et al. |
| 5,710,380 A | | 1/1998 | Talley et al. |
| 6,481,265 B1 | * | 11/2002 | Weber |

FOREIGN PATENT DOCUMENTS

| | | | | |
|---|---|---|---|---|
| DE | 2826343 | * | 1/1979 | .................. 165/54 |
| DE | 3006318 | * | 8/1981 | .................. 165/54 |
| DE | 3521494 | * | 12/1986 | .................. 165/54 |
| DE | 19827031 A1 | | 12/1999 | |
| EP | 0 928 932 A1 | | 7/1999 | |
| FR | 2067079 | * | 8/1971 | ................. 165/165 |
| SE | 470 194 B | | 11/1993 | |
| WO | WO 97 35152 A1 | | 9/1997 | |

* cited by examiner

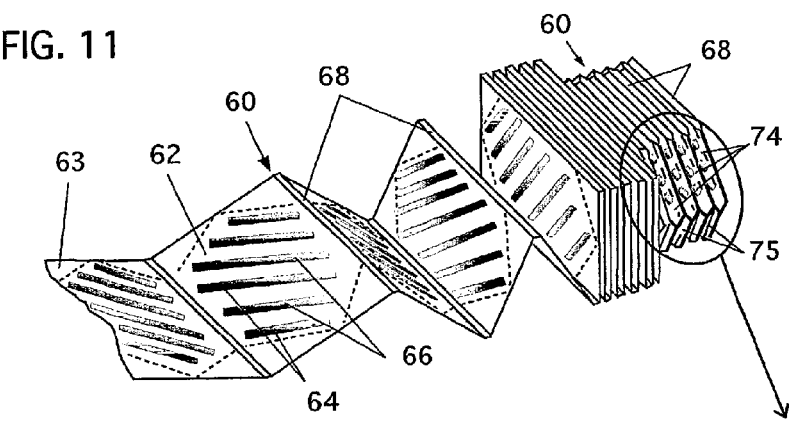
FIG. 11
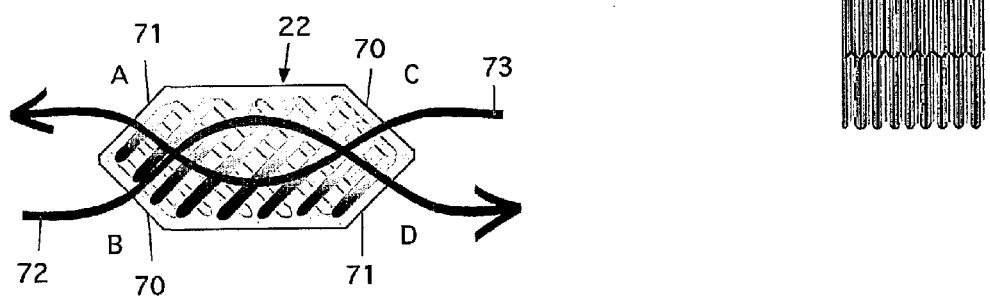
FIG. 12 a
FIG. 13
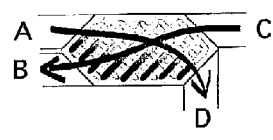
FIG. 12 b
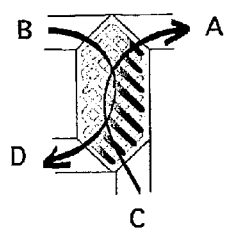
FIG. 12 c
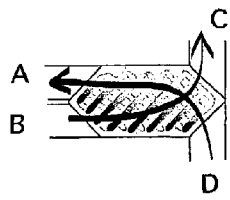
FIG. 12 d
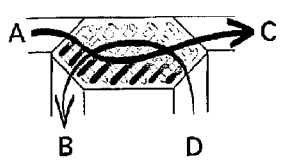
FIG. 12 e            FIG. 12 f

VENTILATION DEVICE

The present invention relates to a ventilation device for ventilation room by room and/or zone by zone, and which comprises a heat-exchanger of counter current-type, transferring heat from the ingoing and outgoing airflows.

BACKGROUND OF THE INVENTION AND THE PROBLEM

Generally, ventilation facilities consist of large, centrally positioned and centrally controlled, assemblies with large energy demands, and with an extensive system of ducts for ingoing and outgoing air. The duct system branches off towards the locations of consumption, where preadjusted air terminal devices control the amount of air that a room is expected to require. The air ducts often cross fire cells, and in these cases they are generally equipped with automatic fire valves. Further, the ducts need to be sound dampened, partly because of overhearing between rooms through the air terminal devices and the duct system, and partly due to the sounds that are generated by fans and to the sounds arising in the usually strictly controlled air terminal devices. The facilities are equipped with filters against dust and small particles, but they still get contaminated and have to be cleaned. Presently, there is an increasing concern about how the indoor environment is affected by air passing over long distances in more or less clean ducts, and the kind of spreading of odours and bacteria it may cause.

Large fan assemblies in day care centres, schools, and the like, demand large spaces in the form of separate fan rooms, which have to be sufficiently large and accessible to function as worksite for the operating staff running the facility. Further, buildings are usually constructed with larger ceiling height than required by the user, in order to generate space for the installation of the system. If this space is not concealed with an extra inner ceiling, visible ducts arise, which then have to be made aesthetically appealing. Further, dust-collecting surfaces, which are difficult to clean, arise through such installations.

In order to control a ventilation facility of this magnitude, computer controlled regulating equipment, so called CSC:s (=Computerized Sub-Centrals) are installed, which, apart from the controlling computer itself, consists of measuring equipment/transmitters positioned throughout the building. These are connected to the CSC through separate lines, and form a separate network of cables in the building. In addition to the control unit, the ventilation assemblies demand electrical power, with separate feeding of power to the fan room, where the ventilation facility often also is equipped with a separate distribution box. If insulated ventilation ducts are placed in a sheltered outside position, for example, on an unheated attic, they will not use any indoor space, but by being connected between indoor rooms and the ventilation unit in which heat exchange and heating tales place, the walls of the ducts should be viewed as an extension of the climate shell of the building. The costs for the ventilation contract usually constitute about 15%, the contract for the controlling units approximately 15%, while the extra building area for the equipment room constitutes about 3–5%. Finally the extra ceiling height in order to make room for the installation may be added, which entails another 3–5%. In addition to this are the costs of the electrical power facility for the ventilation device.

Such ventilation devices may also be equipped with heat-exchangers, see U.S. Pat. No. 5,024,263, which shows a typical example of a large, centrally placed and centrally controlled device, intended to be connected to a ventilation system, in which a large amount of energy is used simply to transport the air. Being able to balance and control the airflows are of course desirable also in large systems. However, the regulation of airflows in said document is limited in direct connection to the unit, and within the unit. It does not guarantee a balanced flow of air into each room. An unscheduled adjustment, e.g., of an valve of ingoing air, or by the opening of a window when the wind blows head on, in one of the rooms that is supplied, together with several other rooms, from the same duct of ingoing air, would affect the pressure conditions in the duct so that, due to the pressure increase, more ingoing air would flow to the other rooms along the duct of ingoing air. If the decreased flow also affects the flow sensor in the centrally placed ventilation device into changing the fan output, or some valve flap, in order to compensate, the air balance would be further changed for all rooms supplied by the same duct for ingoing air.

A further drawback of this ventilation system according to prior art is the bypass-arrangement, which allows outgoing air to flow across to the ingoing side, which means pollution of the ingoing air. Contagion could be transferred between rooms, and cooking fumes and air from toilet facilities could be spread throughout the entire building. Internal leakage in heat-exchangers is another problem in large systems with an extensive flap system, which may allow leakage between ingoing and outgoing air.

Through SE-B-470,194, is prior known a method for controlling the amounts of air across a heat-exchanger, which method is claimed to achieve a kind of balance point in the airflows, oscillating within the area of maximum efficiency. The method assumes that a temperature difference arises when a medium has passed the heat-exchanger, which, of course, is normal during heat exchange. The control of the fan output is based on temperature differences. Consequently, there are no readable values which can regulate the output of the fan when the outdoor and indoor temperatures are the same or similar, i.e. in the interval where no heat exchange takes place.

DE 2,906,837 A1 discloses a heat-exchanger according to the counter-flow principle, intended for ventilation of rooms, and where the heat-exchanger is arranged in a duct below and along a window. The heat-exchanger takes in fresh air from the outside, and heats it by the outgoing air. The difficulty, so far, has been to scale down the dimensions sufficiently to house the heat-exchanger and the control equipment within the short duct defined by the thickness of the wall.

THE OBJECT OF THE INVENTION AND THE SOLUTION TO THE PROBLEM

The object of the present invention is to provide:
a ventilation device with heat exchange with sufficiently small dimensions to be substantially housed right through an external wall;
a device that balances the volume of ingoing and outgoing air by continuously monitoring and controlling the fan output;
a device, mounted directly into the outer wall of the building, without any air transporting ducts;
a device that is silent and may be regulated in order to be adjusted to ventilation and exchange demands; i.e., it may be controlled by the actual demand;
a device that is favourable from environmental point-of-view, i.e., it should consume small amounts of energy;

a device that does not demand specific building volumes such as fan rooms;

a device without leakage between ingoing and outgoing air, and which does not transfer odours or other substances between rooms;

a device that is easily accessible and maintained;

a device that, during completion in an existing building, does not require large interventions in the building;

a device that is characterised by simplicity and obviousness;

a device, the airflow of which should be able to be similar on the ingoing and outgoing sides, even under strain, such as wind pressure/suction on a front, a change in the indoor air pressure due to process or other ventilation, a changed air resistance due to a clogged dust filter, etc.;

a device that does not spread imbalance in airflows to other rooms;

a device that can also be driven by low voltage in order to simplify installation (does not require certification) and reduce electrical interference fields;

a device with high efficiency;

a device in which the total airflow is to be adjustable within a reasonable interval;

if more than one device is included in the same room an/or zone, they should be connectable to be mutually regulated;

a device that from a risk point-of-view is a low-risk product;

a device that works in a ventilation facility independent of other devices, i.e., if one device breaks down no other devices has to be taken out of operation. In certain application it should also be possible to ensure satisfactory ventilation by the remaining devices in the facility automatically covering the loss of ventilation;

the device should be available in several different sizes, adapted for rooms and zones of different sizes and air exchange.

These tasks have been solved through the characteristics indicated in the accompanying claims.

The ventilation device according to the invention is primarily intended to be used in residences, schools, day care centres, etc., but it can also, e.g. together with solar panels, be adapted for ventilation of mobile spaces, such as caravans, work sheds, etc., since the power requirements of the device per $m^2$ of ventilated air is very low. During use in buildings, several ventilation devices may be interconnected through their control units to form large co-operating systems. The ventilation device is also suitable for use in buildings equipped with a conventional ventilation system, but with need of further ventilation, e.g., during reconstruction. Since the volumes of outgoing and ingoing air are equal, this means that the ventilation apparatus does not disturb the rest of the ventilation system.

The small fan motors do not contribute any heat worthy of mention, since they do not have to achieve a high pressure, which is positive during the summer (conventional ventilation devices may contribute a heating effect of up to two degrees, depending upon energy loss in the form of heat from fans and motors). If the outdoor temperature is higher than the indoor temperature, the heat exchange will naturally work, but in the other way round so that the ingoing air will be cooler than the outside air. The specific measurement of the amounts of air according to the invention momentarily affects the fan output in order to constantly balance the flow, so that the flow of ingoing air equals the flow of outgoing air. If the weather is windy, and the wall containing the ventilation device is subject to wind pressure, the fan output for ingoing air is reduced and the fan output for outgoing air is increased, so that the amounts of air are equal at all times.

The ventilation devices are equipped with simple filters to ensure operation, but other types of dust filters and particles filters for purification of air may also be connected to the facility. The filter resistance is also compensated for through the measurement of the amount of air, even though it varies due to contamination.

Hot-wire measurement of air amounts enables calibration of the measurement, and calculation of the true amounts of air passing the device. This enables the controller to compare true amounts of air, at a certain fan output, to the required value. In the case of large deviations, an error message may be given through a signal device. For example, the text "clogged filter" on a display. This display may also indicate amounts of air, temperature, pressure, etc.

DESCRIPTION OF THE DRAWINGS

In the following, the invention will be described in more detail, in a number of embodiments, with reference to the accompanying drawings.

FIG. 10*a* shows a further example of internal mounting of the ventilation device, with a roof lead-through.

FIG. 10*b* shows an example of roof mounting on an uninsulated attic, with a roof lead-through.

FIG. 11 shows a perspective view of a foldable base material for the manufacturing of a heat-exchanger.

FIG. 12*a* shows a foil side of the heat-exchanger in a side view.

FIGS. 12*b–f* shows different possibilities for duct connection 0°–45°–90°.

FIG. 13 shows an end view of a completed heat-exchanger package.

DESCRIPTION OF EMBODIMENTS

Figure 1:
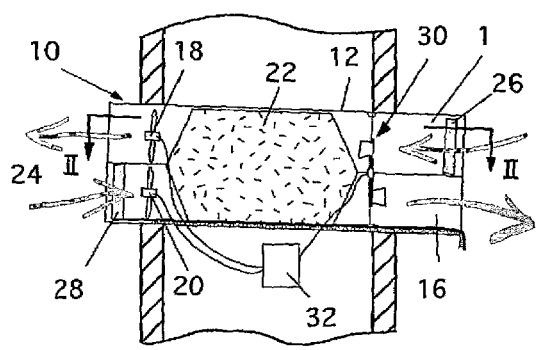
FIG. 1 schematically shows a section through an outer wall, and a therein arranged ventilation device according to the invention.
Figure 2:
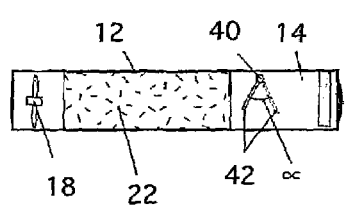
FIG. 2 shows a section along the line II—II in FIG. 1.

The ventilation device of the invention, denoted 10 in the drawings, is, according to FIGS. 1 and 2, constituted of a casing 12, an ingoing air duct 14, leading ingoing fresh air, and an outgoing air duct 16, leading used outgoing air. In each of the ducts a fan 18, 20 is arranged. Centrally in the casing, a heat-exchanger 22 of counter flow type is arranged, i.e., the heat-exchanger is divided into parallel passages, of which every second passage leads the ingoing air, and every other second passage leads the outgoing air in counter flow to and from the room 24, respectively. In the inlet of the respective channels 14, 16, a filter 26, 28 is placed, and in both channels a sensor 30, e.g., an instrument for the measurement of the amount of air flowing through each respective duct, is arranged. The instrument is connected to a control means 32 for controlling the velocity of the fans, so that the amount of air ventilated from the room 24 is substantially equal to the ingoing air taken into the room from the outside, even when the outdoor pressure and the indoor pressure are different from each other. The system compensates for pressure strains in both directions. In certain facilities, however, it may be desirable to have a certain negative pressure or overpressure, wherefore the system also should be able to regulate the amounts of air going in and out through a so-called offset adjustment, i.e., an adjustment where the air amounts are offset from the equilibrium condition. The control means 32 keeps this offset constant.

The sensor 30 is equipped with sensing means 42 in the shape of thin wings in the two ducts (14, 16), which wings 42 are arranged with a mutual angular difference α, according to FIG. 2. The sensing means are affected by the differences in airflow in the two ducts (14, 16), and thereby emit proportional signals, which control the respective fan motor through the control means 32. If, for example, the ingoing airflow increases, the sensing means will be affected so that they will occupy a smaller cross sectional area in the airflow, while at the same time the sensing means in the other duct till have a larger cross sectional area in the airflow, which gives that sensing means a higher flow resistance. These changes in area affect the torque and inhibit overload effects.

The schematic FIGS. 1 and 2, shown in the drawings, illustrate the ventilation device rotated 90° in order to more clearly illustrate the interior. However, it is an advantage if the ducts 14, 16 of the ventilation device are positioned side by side in the horizontal plane, so that condensed water may be conducted out of the ventilation device by gravity, for which purpose the device is arranged slightly inclined. Furthermore, it also obtains a lower building height.

The sensor 30 may be of different types. For example, it may be an instrument for measuring the amount of air flowing through the respective ducts in order to control the fans. It may, for instance, be a prandtl tube, inserted into each duct of the ventilation device, and connected to a pressure sensor. In an additional variant, hot-wire anemometers, are positioned in each duct. This will be described in greater detail further ahead. The sensor 30 may also be a mechanical type with mechanically connected lateral wings on a shaft, where a transmitter registers the rotation of the wings. This may, for instance, be of the optically reflecting type, reacting on movement of a pointer attached to the shaft, or of the optical reading fork type, reacting when a beam of light is broken in the light path, by the motion of a pointer attached to the shaft. It may also be a magnetic sensor, reacting to changes in a magnetic field by a magnetic pointer attached to the shaft, or a magnetic reading fork.

Figure 3:
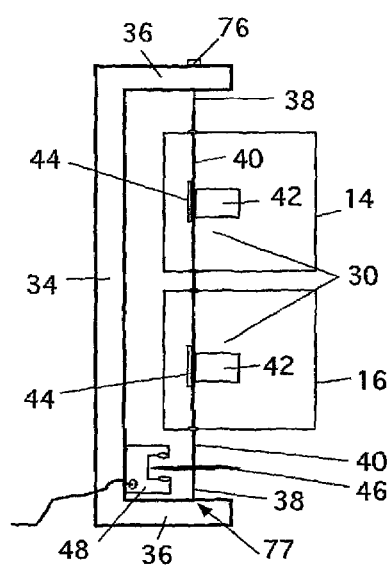
FIG. 3 shows an end view of a sensor for sensing the air amounts in two ducts.

In one embodiment, shown in FIG. 3, a mechanical type of sensor 30 is shown in the form of an instrument for measuring air amounts, as has already been mentioned. It comprises a U-shaped support 34, which may be integrated in the casing 12 of the device, with a shaft 40 fixated between the branches of the support by straps 38. The shaft passes straight through the ingoing and outgoing air ducts 14, 16, and its other end is journalled in the other branch 36 of the support 34. On the shaft 40 is attached, in each duct, a wing 42, each wing equipped with a balancing counter-weight 44, and, outside the ducts, an indicating disc 46, cooperating with an optical reading fork 48, or similar. Suitably, the wing 42 in one of the ducts has an angular difference in relation to the wing in the other duct, so that it is self-inhibitory towards oscillations. The shaft 40 is mounted in straps in order to be able to be rotated without friction, and to be resistant towards wear and pollution. The shaft 40 is adjusted so that the wings in resting condition assume a zero position, in which the wings are substantially lateral to the duct. Adjustment is made by an angular adjustment device 76, arranged at one of the attachments of the shaft to the U-shaped support. The other end of the shaft, which is fastened by straps to the support, maintains its position. If the same amount of airflows in either direction in the ducts 14, 16, the sum of the torques will be zero, and the shaft will assume its zero position, governed by the torsion forces in the straps. Deviations from the zero position in either way is indicated by the position indicating disc 46, and the reading fork 48 gives signals, via the control means 32, to one of the fan motors to increase or reduce the velocity of the fan, while deviations in the other direction affects the other fan motor.

Figure 4:
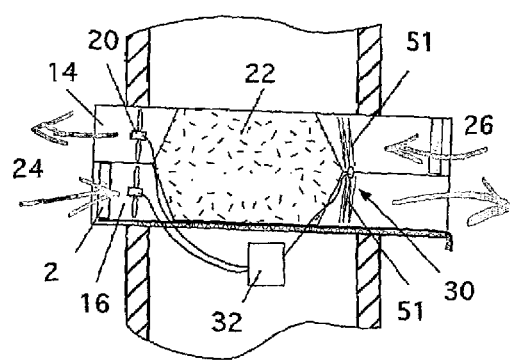
FIG. 4 shows a section, analogous with FIG. 1, through a ventilation device of the invention, with a modified sensor for measuring the amounts of air.
Figure 5:
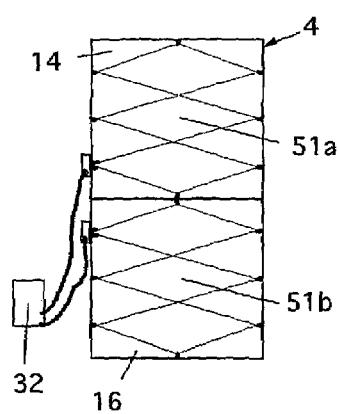
FIG. 5 shows an end view on a larger scale of the hot-wire anemometer illustrated in FIG. 4.

Instead of using this relative measuring method, an absolute measuring method may also be used, where the sensor 30 is constituted, e.g., by a hot-wire anemometer 49, shown in FIGS. 4 and 5, with separate hot-wire fields 51a and 51b in the ingoing and outgoing air ducts 14 and 16, and which enables calibration of the measurement, and to calculate the actual air volume passing through the device.

Figure 16:
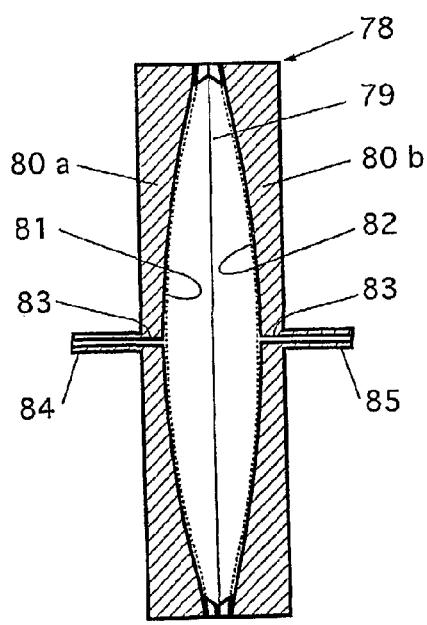
FIG. 16 shows a section through an additional variant of a sensor included in the device.
Figure 17:
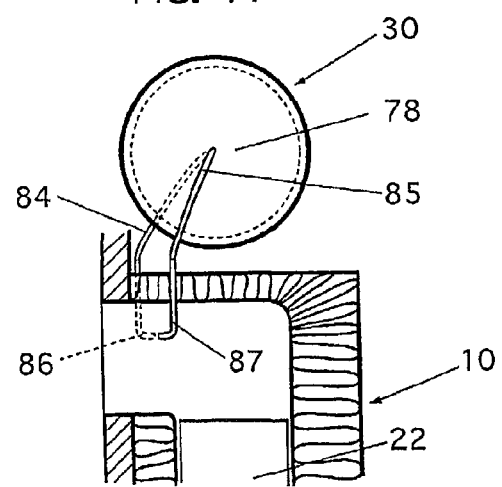
FIG. 17 shows the sensor illustrated in FIG. 16, mounted in a space before or after the heat-exchanger.

Another suitable variant of the sensor 30 is shown in FIGS. 16 and 17, and consists of a pressure cell 78 with dual action, with a membrane 79 attached between to cell halves 80a and 80b, each designed with a circular, concave cavity 81 and 82. From the center of each cavity a duct 83 extends, which via a duct 84, 85 is connected to two separate Pitot tubes 86, 87, the mouths of which are situated in the ingoing and outgoing air ducts 14, 16, respectively, of the heat-exchanger 22. The mouth of one Pitot tube is directed towards the air flowing into the heat-exchanger, whereas the mouth of the other Pitot tube is directed towards the air flowing away from the heat-exchanger. Thus, the membrane 79 will be affected by separate airflows on either side, and will bulge more or less to either side, depending on the pressure ratio. The concave cavities 81, 82 of the pressure cell 78, and the two surfaces of the membrane 79 are coated with an electrically conducting layer, which layers are electrically insulated from one another. The layers form two electrical capacitors, changing their capacitance depending on the position of the membrane. The electrically conducting layers of the membrane 79, and at least one of the electrically conducting layers of the cavities, are connected to the control means 32 for controlling the velocity of the fan motors. Thus, the capacitors form at least one electrically oscillating circuit together with the controlling equipment, in such a way that a changed position of the membrane gives a changed frequency.

A textile dielectric may be located on the electrical layers of the concave cavities 81, 82, the purpose of which being to prevent short circuiting at extreme values, and to facilitate air transport during extreme positions.

Figure 6:
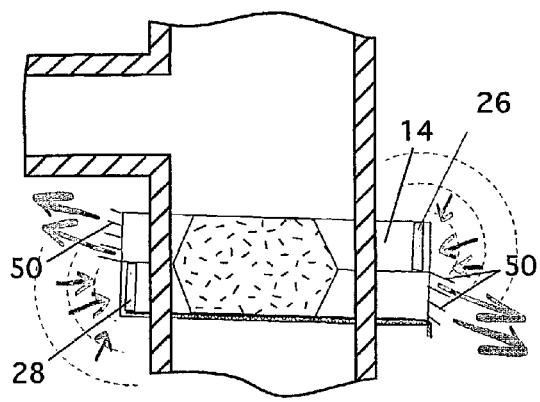
FIG. 6 shows a section through a ventilation device with control flanges for separation of the airflows.

The air flowing from the ducts 14, 16 has a certain velocity and a certain throw length before air-mixing turbulence deteriorates the airflow. The throw length of the outflowing air, and the way the inflowing air is collected prior to entering the ducts determines that the passage of air between the ducts is small, in spite of the fact that the inlet and outlet lie side by side. Guiding flanges 50 at the outlets, see FIG. 6, or laterally oriented inlets or outlets may separate the airflows entirely.

The ventilating device may be adjusted for different levels of air exchange in order to be adjustable to the need for fresh air. The adjustment may be manual or through sensors placed in the room or zone, indicating the need for air exchange. Suitable sensors that may be employed include, e.g., carbon dioxide sensors, humidity sensors, or carbon dioxide sensors in combination with temperature sensors.

At each adjusted exchange level, the fans are controlled so that substantial equilibrium between the two airflows is achieved, i.e., if the airflow is greater in the first duct, the fan output in that duct decreases, while at the same time being increased in the other duct. The ratio between increase and decrease of the fan output for each fan is calibrated for the device so that the total flow conforms to the preset exchange level.

During frost, the temperature in the external part of the heat-exchanger 10 may drop below the freezing point. This is indicated by a temperature gauge, placed in, or immediately adjacent to, the heat-exchanger 22. Preferably, the temperature gauge is positioned so that it is in contact with the coldest spot of the heat-exchanger. There are several alternative solutions to achieve defrosting. One way is to interrupt the heat exchange work and close down the ingoing air fan, so that warm outgoing air can thaw the ice. This is maintained until the defrosting is completely carried out. In another method, demonstrated in FIG. 7, outflowing warm air from the duct may be caused to turn more or less around by a valve 52, whereby the temperature of the external parts of the heat-exchanger is raised, while at the same time the total effect of the heat exchanging and ventilating capacity does not cease completely. Either the valve 52 may be allowed to continuously assume different, partly opened positions, so that the temperature in the coldest parts of the heat-exchanger are always kept at least a few degrees above the freezing point, or the unit may be cyclically defrosted. In this case, a certain freezing is allowed in the heat-exchanger package, before the valve allows the defrosting function to be actuated, by completely recirculating the ingoing and outgoing air. The defrosting continues until it has been carried out completely, and the temperature starts to rise above the freezing point in the heat-exchanger. In order for things to work optimally, the device should be equipped with a hygrometer for the indoor air, in addition to a thermometer, and calculate the time between the defrosting intervals through a calculation model in the control means.

Figure 7:
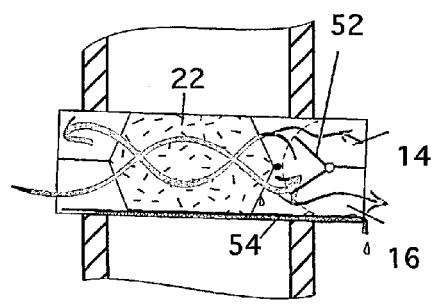
FIGS. 7 and 8 show a section through a ventilation device, with devices for defrosting of the heat-exchanger.
Figure 8:
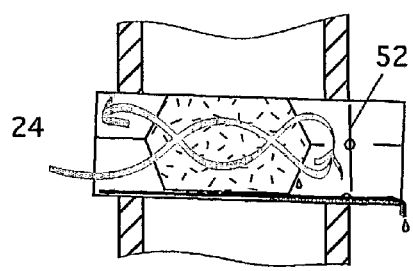

The valve device may be embodied either in the form of a double valve, FIG. 7, acting symmetrically in both air ducts (this embodiment is less disturbing during measuring of air amounts), and suitable for continuous temperature compensation, or the valve 52 may be embodied in the form of a single valve, see FIG. 8, rotated into the air ducts, while at the same time exposing a short-circuiting channel, which embodiment is suitable for cyclic defrosting.

The casing 12 comprises a heat conducting bottom panel 54, conducting heat away from the part of the casing situated indoors. At least the part of the panel situated on the cold side is insulated, but uninsulated where it comes into contact with condensed water. The water is not allowed to freeze, and, thus, no ice can be formed.

Figure 9:
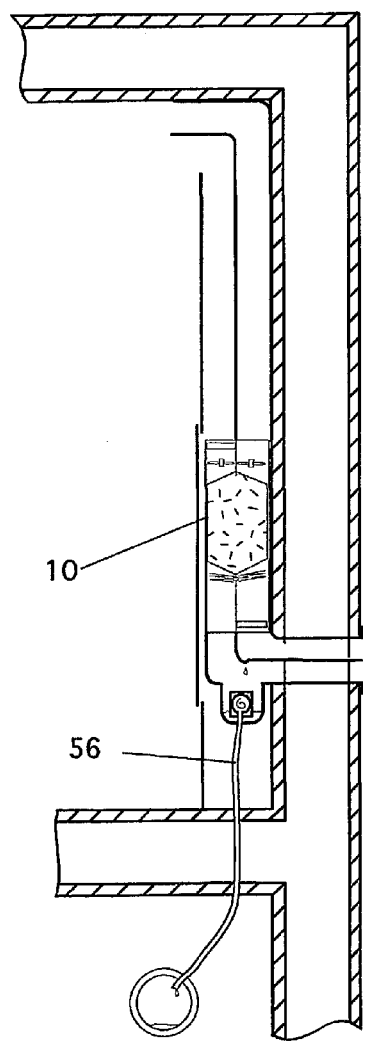
FIG. 9 shows an example of internal mounting of the ventilation device.

As evident from FIG. 9, the ventilation device 10 may also be mounted vertically, entirely indoors, with short drawing of ducts. The ventilation device may, for instance, be mounted standing along a wall, e.g., in the form of a pillar, or advantageously be turned with its flat side against the wall, which above all gives a lesser building depth. The condensed water is collected in a container, and conducted to a drain, or directly to the outside as shown in FIGS. 9, 10*a*, and 10*b*.

Figure 10:
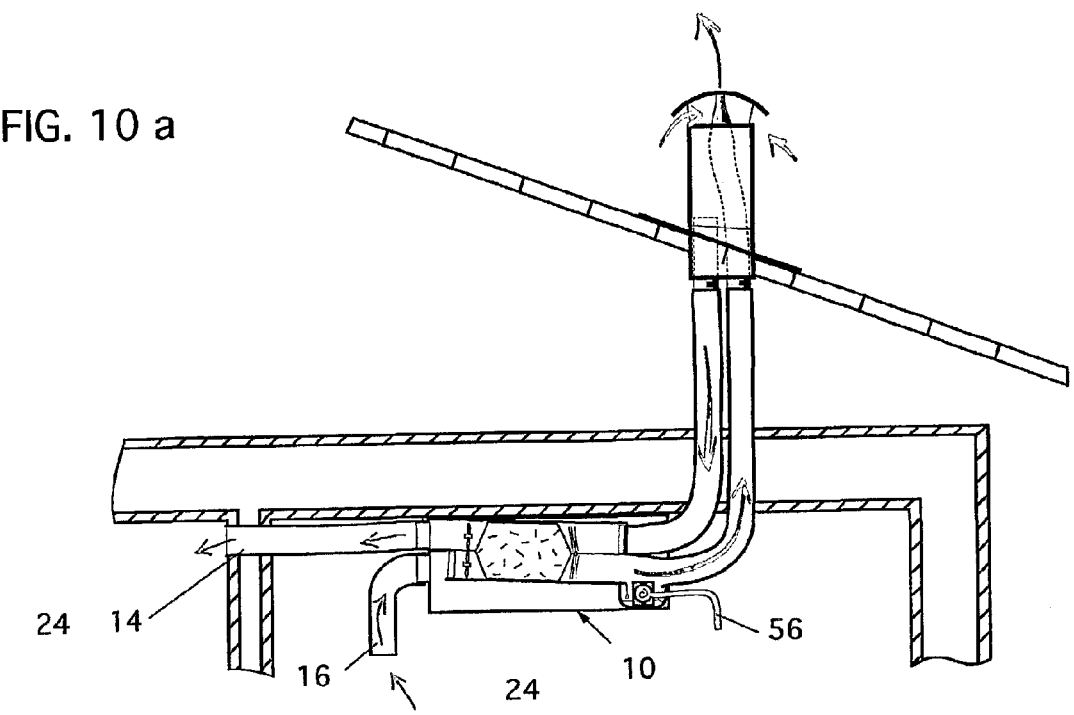
Figure 10:
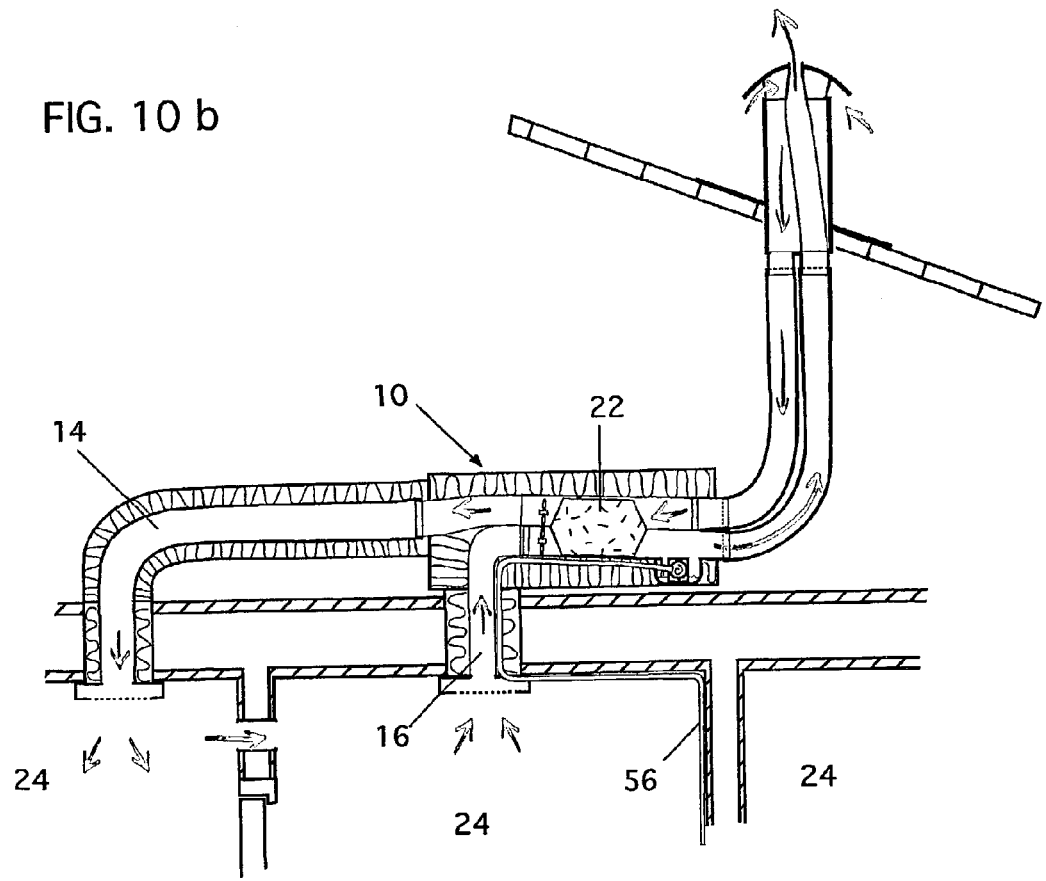

During internal mounting with a roof lead-through, see FIG. 10*a*, condensed water and eventual rainwater may be conducted to the outside, or collected in a container to be pumped away in a hose 56 to a drain. The inlet and outlet for the ingoing and outgoing air may be arranged in an air terminal device in the roof. The pipes below the roof does not need to be insulated, since the heat exchange takes place indoors.

The ventilation device according to the invention may also be mounted in an unheated attic with a roof lead-through as in FIG. 10*b*. Since, at such mounting, the heat exchange is conducted in a space of substantially the same temperature as the outdoor air, insulating material around the pipes and the heat-exchanger is required, however, this is not needed for the pipes extending from the heat-exchanger and out through the outer roof.

The heat-exchanger 22, as mentioned earlier, is of the counter flow type, and designed so that the ingoing and outgoing air enters into and exits from, respectively, the heat-exchanger, in parallel. As indicated in FIG. 11, it may be manufactured from a single, long, foldable foil 60, alternatively from separate foil sheets. The foil sides 62 are equipped with embossings in the shape of grooves 64, 65, which are embossed interchangeably as depressions 64 and ridges 66. Their function is to keep the foil material apart in order to create air ducts, partly to increase the air turbulence inside the heat-exchanger, and partly to distribute the air over the entire foil side surface. The grooves also endow rigidity of shape to the heat-exchanger package.

Upon folding of the foil sides 62 and 63 along the folding lines 68, the grooves 64, 66 on one foil side will be situated at an angle with respect to the grooves in the other, opposite side 63, which sides after the folding will be resting against each other. The sides of the heat-exchanger are folded to a package, see FIG. 13, and sealed, e.g., through gluing or welding, along the angle-cut edges 70, 71, so that separate passages 74, 75 are formed, alternately for ingoing and outgoing air, in separate, counter flow directions. The inlets and outlets of the passages are angled relative one another in order to reduce the risk of short circuiting the airflows, and to obtain a good shape so that the duct may be connected in different angels, according to FIGS. 12*b–f*.

The airflow, according to FIG. 12*a*, which may be the outgoing air, enters the heat-exchanger 22 at B and exits at D, while the ingoing airflow 73 enters at C and exits at A. Thus, only a thin layer of foil separates the ingoing and outgoing air passage from each other, during which passage heat exchange takes place. Foil material, for instance, of plastic or metal may be used. Alternatively, material with hygroscopic properties may be used.

As previously mentioned, overpressure or negative pressure may be desirable in a room. In this case, the fans may deviate from the principle of equal flow by pre-balancing different flows; however, the demand for equilibrium is retained, that is, one of the fans is adjusted with a certain difference compared to the other, and the equilibrium is compensated through balancing, or by calibrating the ventilation device to the desired ratio. This ratio, offset, is preserved through the control means 32. The heat transfer of the ventilation device will become uneven, either higher or lower, depending on which airflow dominates.

Figure 14:
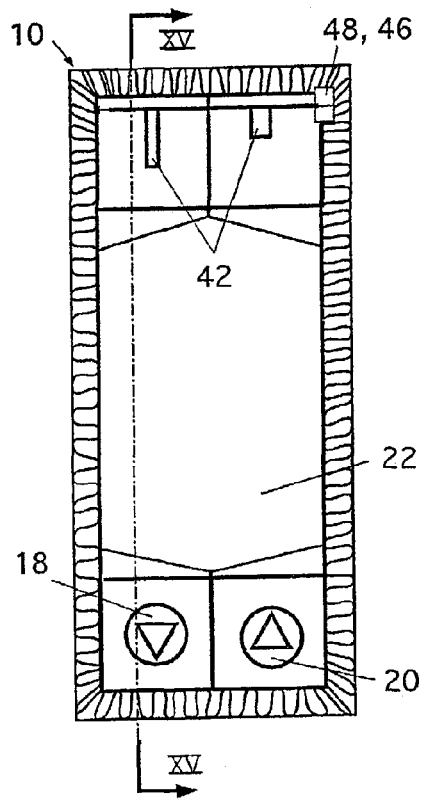
FIG. 14 shows a section through a modified ventilation device for very thin wall sections.
Figure 15:
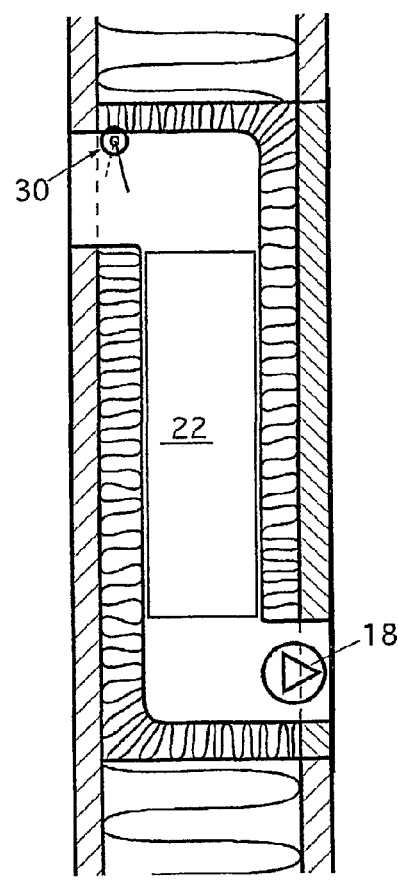
FIG. 15 shows a section along the line XV—XV in FIG. 14.

In some cases, when the wall section is very thin, but there is still a demand that the ventilation device be totally housed within the wall, or if there is demand for a larger heat-exchanger than allowed by the space, the embodiment shown in FIGS. 14 and 15 may be applied, where the heat-exchanger 22 is vertically arranged.

The invention is not limited to the demonstrated and described embodiments; rather, a multitude of variations may be used within the scope of the enclosed claims.

A Listing of Reference Numerals

10 ventilation device
12 device casing
14 ingoing air duct
16 outgoing air duct
18,20 fan
22 heat-exchanger
24 room
26,28 filter
30 sensor/instruments for measuring air amounts
32 control means
34 support
36 branches
38 straps
40 shaft
42 sensing means/wing
44 counter weight
46 position indicating disc
48 optical reading fork
49 hot-wire anemometer
50 guiding flanges
51 hot-wire field
52 valve (part of duct side)
54 bottom panel
56 hose
58 grooves
60 foil
62,63 foil side
64,66 grooves
68 folding lines
70,71 angle-cut edge
72 outgoing flow
73 ingoing flow
74,75 cells/passages
76 angular adjustment device
77 fastening for straps
78 pressure cell
79 membrane
80 cell halves
81,82 concave cavities
83 duct
84,85 lines
86,87 Pitot tube

What is claimed is:

1. A ventilation device for ventilation of a room comprising:
   a device casing, which is provided in or adjacent to an outer wall of said room and which connects room air to outside air;
   a counter flow heat-exchanger, provided in the casing and transferring heat between outgoing and ingoing airflows, respectively;
   two fans arranged in said casing, of which one is connected to an ingoing air duct of the heat-exchanger and the other to an outgoing air duct of the heat-exchanger;
   a sensor arranged to detect airflows in said outgoing air duct and said ingoing air duct and emit signals proportional to said airflows;
   a control means, which, depending on the values given by the sensor, is arranged to regulate rotation speeds of the fans according to said proportional signals, wherein:
   the sensor comprises first sensing means arranged in the ingoing air duct and second sensing means arranged in the outgoing air duct; and
   said first and second sensing means are connected to each other and arranged to be affected by the difference in airflow in the two ducts by deviating from a neutral position, to thereby emit said signals proportional to the difference in airflow to the control means for controlling the rotation speeds of the fans,
   wherein said sensing means are connected to each other through a shaft; and said sensor comprises a device for monitoring the position of said sensing means and transmitting signals to said control means.

2. A ventilation device according to claim 1, wherein:
   at least one valve is arranged between said two ducts after said heat exchanger in the direction of outgoing air flow; and
   said valve being arranged to lead at least a part of the airflow in the outgoing air duct into the ingoing air duct and thereby defrost the heat exchanger by way of the outgoing air.

3. A ventilation device according to claim 1, wherein said ingoing air duct and said outgoing air duct are connected to the same room.

4. A ventilation device according to claim 1, wherein said ingoing air duct and said outgoing air duct are located side by side, having at least one common wall.

5. A ventilation device according to claim 1, wherein an outlet of said ingoing air duct is located side by side with an inlet of said outgoing air duct.

6. A ventilation device according to claim 1, wherein said control means is arranged to regulate said two fans to balance the air flows through said ingoing air duct and outgoing air duct to achieve a predetermined air flow difference there between.

7. A ventilation device according to claim 6, wherein said predetermined air flow difference is zero.

8. A ventilation device according to claim 1, wherein: at least the bottom of the casing is designed with a small inclination for draining condensed water; and the cold part of the bottom is thermally insulated and the part of the bottom contacting condensed water is uninsulated.

9. A ventilation device according to claim 1, wherein:
   the heat-exchanger comprises a strip of foldable segments of a foil material;
   faces of successive foldable segments of the foil material face each other when folded to form flow cells for the ingoing air and the outgoing air; and
   the faces of successive foldable segments comprise spacing means, said spacing means comprising depressions and ridges arranged to extend in opposite directions on each successive foldable segment.

10. A ventilation device according to claim 1, wherein said device for monitoring the position of said sensing device is: an optical reading fork; an electrical potentiometer; a magnetic reading fork; or a magnetic sensor.

11. A ventilation device for ventilation of a room comprising:

a device casing, which is provided in or adjacent to an outer wall of said room and which connects room air to outside air;

a counter flow heat-exchanger, provided in the casing and transferring heat between outgoing and ingoing airflows, respectively;

two fans arranged in said casing, of which one is connected to an ingoing air duct of the heat-exchanger and the other to an outgoing air duct of the heat-exchanger;

a sensor arranged to detect airflows in said outgoing air duct and said ingoing air duct and emit signals proportional to said airflows;

a control means, which, depending on the values given by the sensor, is arranged to regulate rotation speeds of the fans according to said proportional signals, wherein:

the sensor comprises first sensing means arranged in the ingoing air duct and second sensing means arranged in the outgoing air duct; and said first and second sensing means are connected to each other and arranged to be affected by the difference in airflow in the two ducts by deviating from a neutral position, to thereby emit said signals proportional to the difference in airflow to the control means for controlling the rotation speeds of the fans, wherein:

the sensing means comprises wings arranged with a connecting shaft between the ducts, the wings designed to be affected by the airflow in the two ducts; and the sensor comprises an optical level indicator, which is arranged to emit a signal corresponding to the deviation of the wings from the neutral position to the control means for controlling the rotation speeds of the fans.

12. A ventilation device according to claim 11, wherein:

at least one valve is arranged between said two ducts after said heat exchanger in the direction of outgoing air flow; and said valve being arranged to lead at least a part of the airflow in the outgoing air duct into the ingoing air duct and thereby defrost the heat exchanger by way of the outgoing air.

13. A ventilation device according to claim 11, wherein said ingoing air duct and said outgoing air duct are connected to the same room.

14. A ventilation device according to claim 11, wherein said ingoing air duct and said outgoing air duct are located side by side, having at least one common wall.

15. A ventilation device according to claim 11, wherein an outlet of said ingoing air duct is located side by side with an inlet of said outgoing air duct.

16. A ventilation device according to claim 11, wherein said control means is arranged to regulate said two fans to balance the air flows through said ingoing air duct and outgoing air duct to achieve a predetermined air flow difference there between.

17. A ventilation device according to claim 16, wherein said predetermined air flow difference is zero.

18. A ventilation device according to claim 11, wherein: at least the bottom of the casing is designed with a small inclination for draining condensed water; and the cold part of the bottom is thermally insulated and the part of the bottom contacting condensed water is uninsulated.

19. A ventilation device according to claim 11, wherein: the heat-exchanger comprises a strip of foldable segments of a foil material;

faces of successive foldable segments of the foil material face each other when folded to form flow cells for the ingoing air and the outgoing air; and the faces of successive foldable segments comprise spacing means, said spacing means comprising depressions and ridges arranged to extend in opposite directions on each successive foldable segment.

20. A ventilation device for ventilation of a room comprising:

a device casing, which is provided in or adjacent to an outer wall of said room and which connects room air to outside air;

a heat-exchanger, provided in the casing and transferring heat between outgoing and ingoing airflows, respectively;

two fans arranged in said casing, of which one is connected to an ingoing air duct of the heat-exchanger and the other to an outgoing air duct of the heat-exchanger;

a sensor arranged to detect airflows in said outgoing air duct and said ingoing air duct and emit signals proportional to said airflows;

a control means, which, depending on the values given by the sensor, is arranged to regulate rotation speeds of the fans according to said proportional signals, wherein:

the sensor comprises sensing means arranged in the ducts and connected to each other through a shaft, said sensing means being arranged to be affected by the airflow in the two ducts and emit a signal, corresponding to the deviation of the sensing means from the neutral position, to the control means for controlling the rotation speeds of the fans;

and the sensor comprises: an optical reading fork; a magnetic reading fork; an electrical potentiometer; or a magnetic sensor.

21. A ventilation device for ventilation of a room comprising:

a device casing, which is provided in or adjacent to an outer wall of said room and which connects room air to outside air;

a counter flow heat-exchanger, provided in the casing and transferring heat between outgoing and ingoing airflows, respectively;

two fans arranged in said casing, of which one is connected to an ingoing air duct of the heat-exchanger and the other to an outgoing air duct of the heat-exchanger;

a sensor arranged to detect airflows in said outgoing air duct and said ingoing air duct and emit signals proportional to said airflows;

a control means, which, depending on the values given by the sensor, is arranged to regulate rotation speeds of the fans according to said proportional signals, wherein:

the sensing means is constituted by wings arranged with a connecting shaft between the ducts, which wings is designed to be affected by the airflow in the two ducts; and the sensor comprises an optical level indicator, which is provided to emit a signal corresponding to the deviation of the wings from the neutral position to the control means for controlling the rotation speeds of the fans.

* * * * *